(12) United States Patent
Rao et al.

(10) Patent No.: US 11,379,279 B2
(45) Date of Patent: Jul. 5, 2022

(54) NETLINK ASYNCHRONOUS NOTIFICATIONS FOR NATIVE AND THIRD PARTY APPLICATION IN DISTRIBUTED NETWORK SYSTEMS

(71) Applicant: Juniper Networks, Inc., Sunnyvale, CA (US)

(72) Inventors: Amit Kumar Rao, Ontario (CA); Luc N. Bazinet, Ottawa (CA)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/829,685

(22) Filed: Mar. 25, 2020

(65) Prior Publication Data

US 2020/0226010 A1 Jul. 16, 2020

Related U.S. Application Data

(63) Continuation-in-part of application No. 16/115,026, filed on Aug. 28, 2018, now Pat. No. 11,165,625.

(60) Provisional application No. 62/955,941, filed on Dec. 31, 2019.

(30) Foreign Application Priority Data

Jun. 28, 2018 (IN) .............................. 201841024081

(51) Int. Cl.
*G06F 15/16* (2006.01)
*G06F 9/54* (2006.01)
(52) U.S. Cl.
CPC .................................... *G06F 9/545* (2013.01)
(58) Field of Classification Search
CPC ....................................................... G06F 9/545

USPC ......................................................... 709/224
See application file for complete search history.

(56) References Cited

U.S. PATENT DOCUMENTS

| 2002/0071436 | A1 | 6/2002 | Border et al. | |
|---|---|---|---|---|
| 2003/0182431 | A1* | 9/2003 | Sturniolo | H04W 76/20 709/227 |
| 2009/0274045 | A1* | 11/2009 | Meier | H04L 12/66 370/468 |
| 2013/0055287 | A1* | 2/2013 | Pope | G06F 9/541 719/314 |

(Continued)

OTHER PUBLICATIONS

Ayuso P.N., et al., "Communicating Between the Kernel and User-Space in Linux using Netlink Sockets," https://pdfs.semanticscholar.org/6efd/e161a2582ba5846e4b8fea5a53bc305a64f3.pdf, 2010, 17 pages.

(Continued)

*Primary Examiner* — George C Neurauter, Jr.
*Assistant Examiner* — Joel Mesa
(74) *Attorney, Agent, or Firm* — Harrity & Harrity, LLP

(57) ABSTRACT

An intercept library of a network device may detect a socket system call from an application associated with a user space of the network device. The intercept library may be associated with the user space, and the socket system call may be addressed to a kernel associated with the network device. The intercept library may generate an intercept socket based on the socket system call, and may detect a subscription for asynchronous network state information, wherein the subscription may be generated by the application. The intercept library may provide the subscription to a service daemon via the intercept socket.

20 Claims, 12 Drawing Sheets

(56) References Cited

U.S. PATENT DOCUMENTS

| | | |
|---|---|---|
| 2015/0172153 A1 | 6/2015 | Sharma et al. |
| 2016/0191521 A1 | 6/2016 | Feroz et al. |
| 2017/0099228 A1* | 4/2017 | Hunsperger ............ G06F 9/466 |
| 2018/0007178 A1 | 1/2018 | Subhraveti |
| 2018/0356800 A1* | 12/2018 | Chao ................... G05B 19/406 |
| 2020/0021479 A1 | 1/2020 | Rao et al. |
| 2021/0241831 A1* | 8/2021 | Zhao .................. H01L 45/1233 |

OTHER PUBLICATIONS

Rosen, "Linux Kernel Networking," http://www.haifux.org/lectures/172/netLec.pdf, 2007, 88 pages.

\* cited by examiner

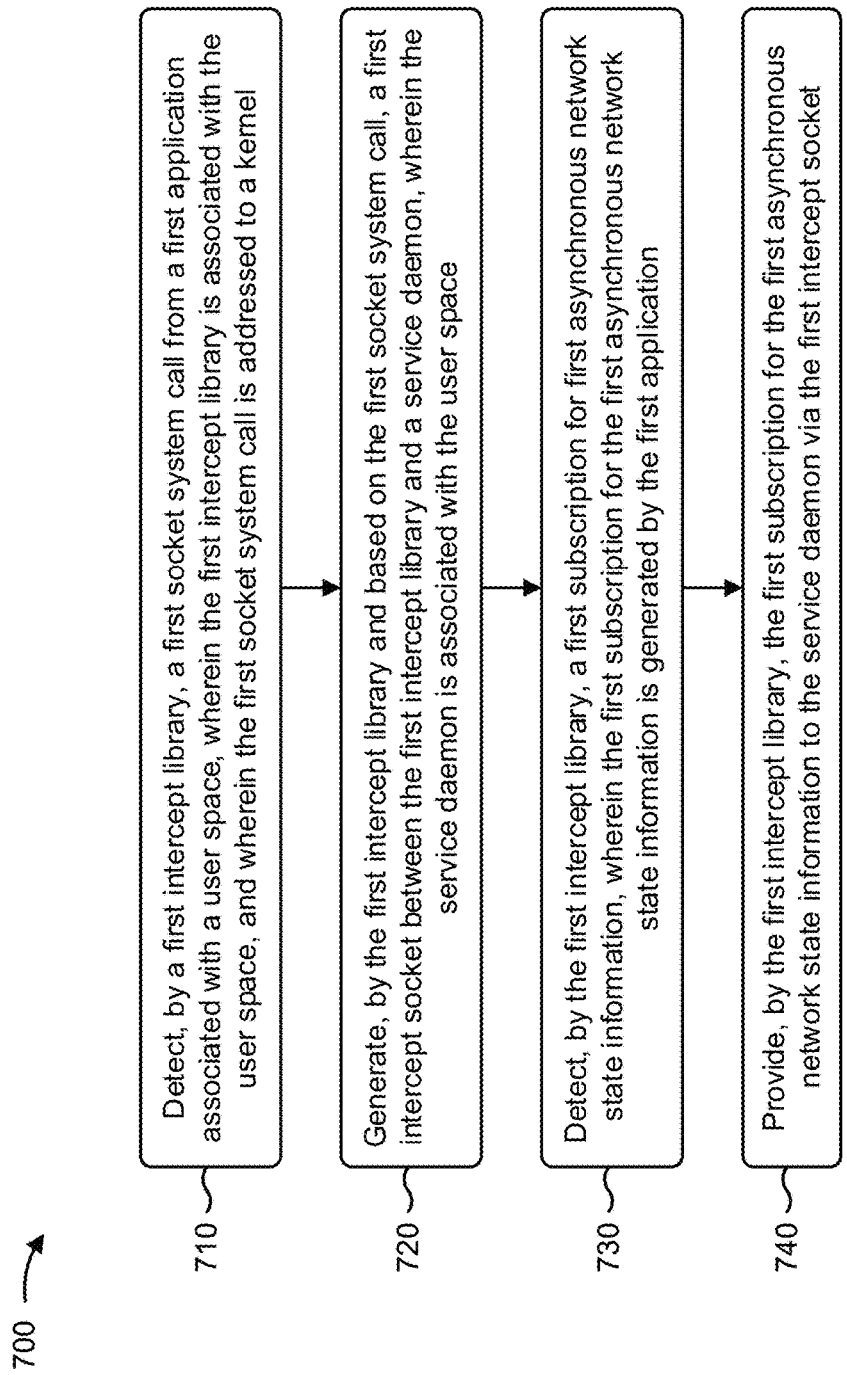

NETLINK ASYNCHRONOUS NOTIFICATIONS FOR NATIVE AND THIRD PARTY APPLICATION IN DISTRIBUTED NETWORK SYSTEMS

RELATED APPLICATIONS

This application is a continuation-in-part (CIP) of U.S. patent application Ser. No. 16/115,026, filed on Aug. 28, 2018, entitled "NETWORK STATE MANAGEMENT," which claims priority to Indian Patent Application No. 201841024081, filed on Jun. 28, 2018, entitled "NETWORK STATE MANAGEMENT," the contents of which are incorporated by reference herein in their entirety. This application also claims priority to U.S. Provisional Patent Application No. 62/955,941, filed on Dec. 31, 2019, entitled "RECEIVING ASYNCHRONOUS NETWORK STATE INFORMATION FROM A NETWORK FOR AN APPLICATION OF A NETWORK DEVICE," the content of which is incorporated by reference herein in its entirety.

BACKGROUND

In a packet routing network device, Netlink sockets (e.g., kernel interfaces) may be used to transfer information between a kernel process and a user space process of the network device. For example, an application of the network device may query a kernel state, add an object, and/or the like, using a Netlink socket. In some network architectures, network state may be maintained in a user space. Alternatively, the network state may be distributed such that multiple network devices of the network architecture store information relating to the network state.

SUMMARY

In some implementations, a method may include detecting, by an intercept library of a network device, a socket system call from an application associated with a user space of the network device, wherein the intercept library may be associated with the user space of the network device, and wherein the socket system call may be addressed to a kernel associated with the network device. The method may include generating, by the intercept library of the network device, an intercept socket based on the socket system call. The method may include detecting, by the intercept library of the network device, a subscription for asynchronous network state information, wherein the subscription for the asynchronous network state information may be generated by the application, and providing, by the intercept library of the network device, the subscription for the asynchronous network state information to a service daemon, of the user space, via the intercept socket.

In some implementations, a network device may include one or more memories, and one or more processors to detect, by an intercept library, a socket system call from an application associated with a user space of the network device, wherein the intercept library may be associated with the user space of the network device, and wherein the socket system call may be addressed to a kernel associated with the network device. The one or more processors may generate, by the intercept library, an intercept socket based on the socket system call. The one or more processors may detect, by the intercept library, a subscription for asynchronous network state information, wherein the subscription for the asynchronous network state information may be generated by the application, and may provide, by the intercept library, the subscription for the asynchronous network state information to a service daemon, of the user space, via the intercept socket. The one or more processors may receive, by the service daemon, the asynchronous network state information, and may broadcast, by the kernel, the asynchronous network state information to the intercept library via the intercept socket. The one or more processors may provide, by the intercept library, the asynchronous network state information to the application.

In some implementations, a non-transitory computer-readable medium may store one or more instructions that, when executed by one or more processors of a network device, may cause the one or more processors to detect, by an intercept library, a socket system call from an application associated with a user space of the network device, wherein the intercept library may be associated with the user space of the network device, and wherein the socket system call may be addressed to a kernel associated with the network device. The one or more instructions may cause the one or more processors to generate, by the intercept library and based on the socket system call, an intercept socket between the intercept library and a service daemon, wherein the service daemon may be associated with the user space of the network device. The one or more instructions may cause the one or more processors to detect, by the intercept library, a subscription for asynchronous network state information, wherein the subscription for the asynchronous network state information may be generated by the application. The one or more instructions may cause the one or more processors to provide, by the intercept library, the subscription for the asynchronous network state information to the service daemon via the intercept socket.

BRIEF DESCRIPTION OF THE DRAWINGS

FIGS. 5-7 are flow charts of example processes for receiving asynchronous network state information for an application of a network device.

DETAILED DESCRIPTION

Figure 1A:
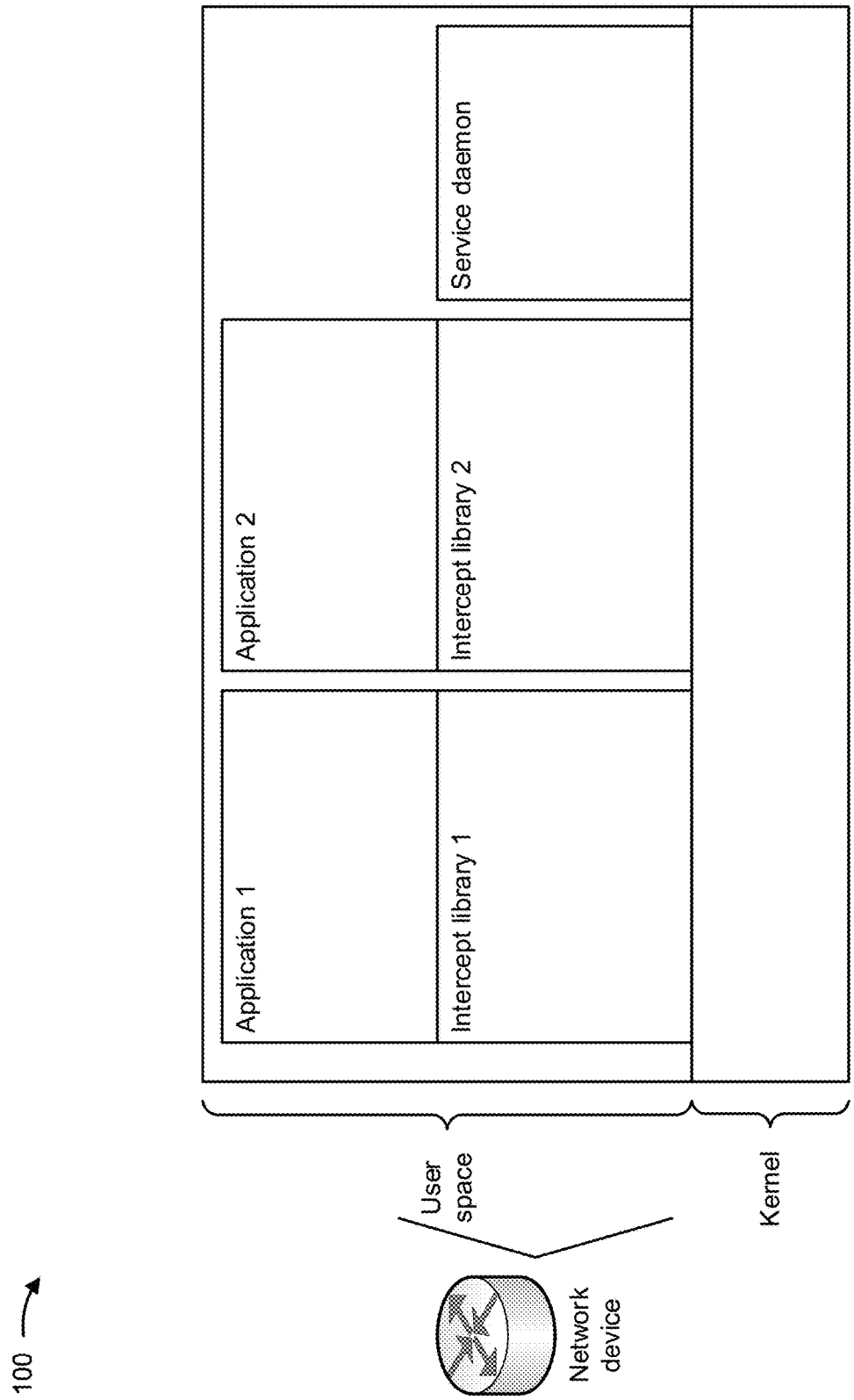
FIGS. 1A-1F are diagrams of one or more example implementations described herein.

The following detailed description of example implementations refers to the accompanying drawings. The same reference numbers in different drawings may identify the same or similar elements.

In a network device, a socket may be used to transfer information between a kernel and a user space process, such as an application operating on the network device. For example, an application of the network device may query a kernel for a network state, add objects to the kernel, and/or the like using a Netlink socket. Additionally, or alternatively, the application of the network device may modify the network state, in the kernel, using a Netlink socket. However, in some cases, a network state may be maintained in a user space and/or may be distributed such that multiple network devices (e.g., nodes of a network) maintain at least a portion of the network state. In this case, when the network state is maintained in the user space and/or distributed to multiple network devices, the application of the network device may generate a request for information relating to the network state from the kernel, and the request may fail as a result of the kernel not storing the information relating to the network state. This may prevent the application from operating on the network device, may reduce functionality of the network device, may negatively impact utilization of a network that includes the network device, and/or the like.

A current technique for receiving network state information may include programming the kernel with the network state information generated in the user space so that applications can receive asynchronous network state notifications generated by existing kernel Netlink infrastructure. However, such a technique requires modifying the kernel to store custom network state information, generates more complex network state information than the network state information maintained by the kernel, increases memory usage of the kernel due to unnecessarily populating the kernel with additional custom network state information, increases an impact of bugs on the kernel, and/or the like. Thus, current techniques for receiving network state information may waste computing resources (e.g., processing resources, memory resources, communication resources, and/or the like), networking resources, and/or the like associated with application modification, application testing, kernel modification, and/or the like.

Some implementations described herein provide a network device that receives asynchronous network state information for an application of a network device. For example, an intercept library of a network device may detect a socket system call from an application associated with a user space of the network device, where the intercept library may be associated with the user space of the network device, and the socket system call may be addressed to a kernel associated with the network device. The intercept library of the network device may generate an intercept socket based on the socket system call, and may detect a subscription for asynchronous network state information, where the subscription for the asynchronous network state information may be generated by the application. The intercept library of the network device may provide the subscription for the asynchronous network state information to a service daemon, of the user space, via the intercept socket.

In this way, the network device may receive asynchronous network state information for applications of a network device. The network device may intercept socket system calls and asynchronous subscriptions for network state information, and may direct the asynchronous subscriptions to a user space service daemon. The service daemon may provide the network state information to a kernel of the network device, and the kernel may broadcast the network state information to the applications of the network device. This, in turn, conserves computing resources (e.g., processing resources, memory resources, communication resources, and/or the like), networking resources, and/or the like that would otherwise be wasted in modifying applications, testing applications, modifying the kernel, and/or the like.

FIGS. 1A-1F are diagrams of one or more example implementations 100 described herein. As shown in FIG. 1A, a network device may include a kernel and a user space that includes a first application (e.g., application 1), a first intercept library (e.g., intercept library 1), a second application (e.g., application 2), a second intercept library (e.g., intercept library 2), and a service daemon. The kernel may include a computer program that is a core of an operating system of the network device. The kernel may have complete control over hardware and software components of the network device, and may facilitate interactions between the hardware components and the software components. In some implementations, when the network device is powered on, the kernel may initialize a new Netlink protocol that generates a socket for communication between the first intercept library and the service daemon, a socket for communication between the second intercept library and the service daemon, and/or the like.

The user space may include a system memory that is allocated to executing applications for the network device. The user space may be separate from the kernel to protect the network device from errant processes that could consume memory required by the operating system of the network device.

Each of the first application and second application may include an application that performs one or more functions for the network device, requires network state information to perform the one or more functions, and/or the like. Each of the first intercept library and the second intercept library may include a function that intercepts a socket system call received from an application and addressed to the kernel, generates an intercept socket based on the socket system call, detects a subscription for asynchronous network state information generated by the application, provides the subscription to the service daemon via the intercept socket, receives the asynchronous network state information via the intercept socket, provides the asynchronous network state information to the application, and/or the like.

The service daemon may include a function that executes one or more background processes. For example, the service daemon may obtain asynchronous network state information relating to network state. In some implementations, the service daemon may obtain network state information stored in the user space from one or more user space applications of the network device. The one or more user space applications may include applications associated with storing, managing, altering, and/or the like the network state. In some implementations, in a distributed system architecture where each network device stores only a portion of the asynchronous network state information, the service daemon may obtain the asynchronous network state information from other network devices.

The network device may receive network state information associated with the network device. In some implementations, the network state information may be maintained in the user space of the network device, and/or may be maintained in a distributed manner where multiple network devices store and/or share the network state information. In some implementations, the network state information may be asynchronous (e.g., not based on time) network state information. In some implementations, the network state information may include information identifying statuses of one or more applications, statuses of multiple links of the network device, statuses of multiple interfaces of the network device, and/or the like.

Figure 1B:
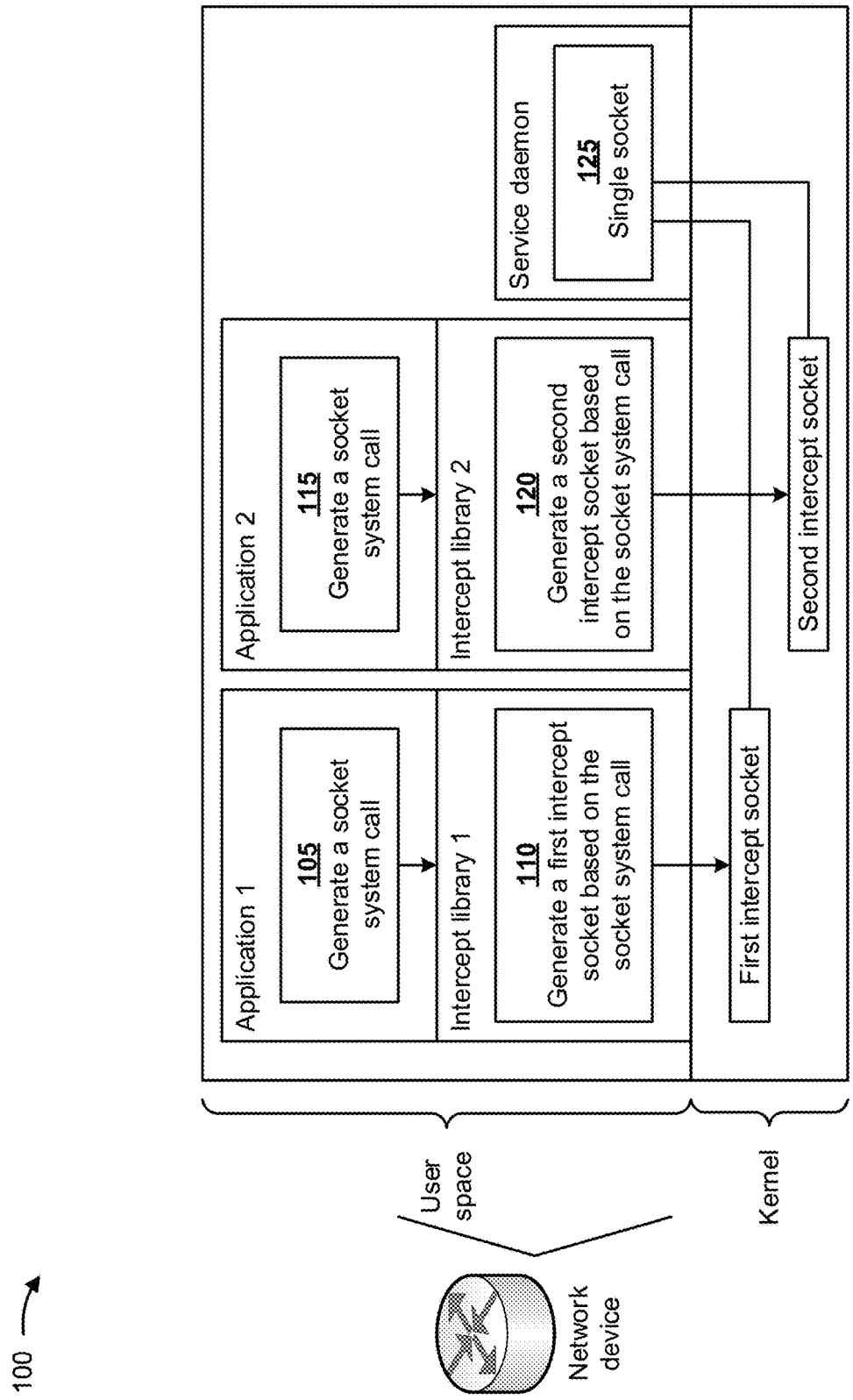

As further shown in FIG. 1B, and by reference number 105, the first application may generate a socket system call that requests creation of a socket for receiving network state information from the kernel. In some implementations, the socket system call may include a request to create a Netlink socket that includes information identifying a family of multiple protocol subsets (e.g., AF_NETLINK), a socket type (e.g., a Netlink socket), routing and link information (e.g., NETLINK_ROUTE), and/or the like. For example, the socket system call may include a particular format, such as socket (AF_NETLINK, socket type, NETLINK_ROUTE), and may establish a socket with the kernel. In some implementations, the first intercept library may intercept the socket system call prior to the socket system call being received by the kernel.

As further shown in FIG. 1B, and by reference number 110, the first intercept library may generate a first intercept socket based on the socket system call. In some implementations, the first intercept library may modify the socket system call so that the first intercept library may enable communication (e.g., via the first intercept socket) between the first application and the service daemon without customizing the first application to identify a storage location of network state information (e.g., the user space or in a distributed architecture). For example, the first intercept library may modify the routing and link information (e.g., NETLINK_ROUTE) of the socket system call to include routing and link information (e.g., NETLINK_NEW_ROUTE) associated with the service daemon. In such an example, the particular format of the socket system call (e.g., socket (AF_NETLINK, socket type, NETLINK_ROUTE)) may be modified to socket (AF_NETLINK, socket type, NETLINK_NEW_ROUTE).

As further shown in FIG. 1B, and by reference number 115, the second application may generate a socket system call that requests creation of a socket for receiving network state information from the kernel. In some implementations, the socket system call may include a request to create a Netlink socket that includes information described above in connection with the socket system call generated by the first application. For example, the socket system call may include a particular format, such as socket (AF_NETLINK, socket type, NETLINK_ROUTE), and may establish a socket with the kernel. In some implementations, the second intercept library may intercept the socket system call prior to the socket system call being received by the kernel.

As further shown in FIG. 1B, and by reference number 120, the second intercept library may generate a second intercept socket based on the socket system call. In some implementations, the second intercept library may modify the socket system call so that the second intercept library may enable communication (e.g., via the second intercept socket) between the second application and the service daemon without customizing the second application to identify a storage location of network state information (e.g., the user space or in a distributed architecture). For example, the second intercept library may modify the routing and link information (e.g., NETLINK_ROUTE) of the socket system call to include routing and link information (e.g., NETLINK_NEW_ROUTE) associated with the service daemon, as described above.

As further shown in FIG. 1B, and by reference number 125, the service daemon may include a single socket (e.g., which is opened with a NETLINK_NEW_ROUTE protocol) that communicates with the kernel. For example, the single socket may communicate with the first intercept socket and the second intercept socket of the kernel.

Figure 1C:
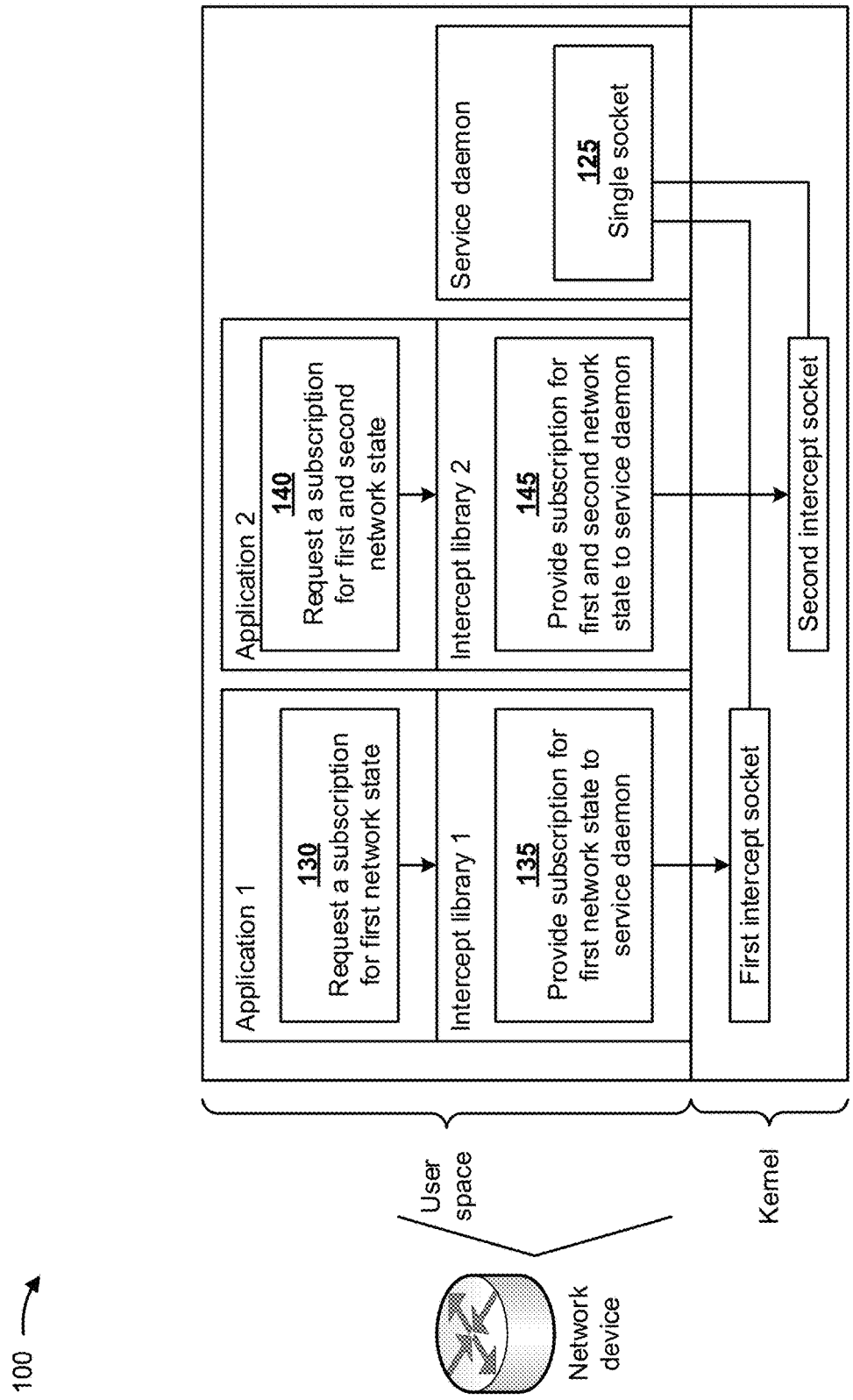

As shown in FIG. 1C, and by reference number 130, the first application may generate a request for a subscription to first network state information (e.g., first asynchronous network state information). In some implementations, the first application may generate the request for the subscription to the first network state information using socket call commands (e.g., a bind command, a setsockopt command, and/or the like). For example, the first application may generate a Netlink socket call command to request the first network state information from the kernel. In some implementations, the request for the subscription to the first network state information may include a particular destination address for the request. For example, the first application may set a Netlink socket identifier (e.g., NETLINK_ROUTE) in a destination socket address of the request to a socket address of the kernel to attempt to access the network state information (e.g., since the first application may be configured to search for network state information in the kernel). In some implementations, the first intercept library may intercept the request for the subscription to the first network state information prior to the request being received by the kernel.

As further shown in FIG. 1C, and by reference number 135, the first intercept library may provide the request for the subscription (e.g., to the first network state information) to the service daemon via the first intercept socket and the single socket. In some implementations, the service daemon may subscribe to receive network state information based on an architecture of the network device, stored in the user space from one or more user space applications, based on subscription requests received from applications, and/or the like. The one or more user space applications may include a user space application that manages a forwarding information base for packet forwarding, a user space application that manages an interface for packet forwarding, and/or the like. In a distributed system architecture where each network device stores only a portion of the network state information, the service daemon may obtain the network state information from other network devices. For example, the service daemon may request network state information from one or more other network devices, and may receive response messages identifying portions of the network state information from the one or more other network devices.

As shown in FIG. 1C, and by reference number 140, the second application may generate a request for a subscription to the first network state information (e.g., the first asynchronous network state information) and second network state information (e.g., second asynchronous network state information) that is different than the first network state information. In some implementations, the second application may generate the request for the subscription to the first network state information and the second network state information using socket call commands (e.g., a bind command, a setsockopt command, and/or the like). In some implementations, the request for the subscription to the first network state information and the second network state information may include a particular destination address for the request. For example, the second application may set a Netlink socket identifier (e.g., NETLINK_ROUTE) in a destination socket address of the request to a socket address of the kernel to attempt to access the network state information (e.g., since the second application may be configured to search for network state information in the kernel). In some implementations, the second intercept library may intercept the request for the subscription to the first network state information and the second network state information prior to the request being received by the kernel.

As further shown in FIG. 1C, and by reference number 145, the second intercept library may provide the request for the subscription (e.g., to the first network state information and the second network state information) to the service daemon via the second intercept socket and the single socket. In this way, the first intercept library and the second intercept library may intercept requests for subscriptions, destined for the kernel, and may re-route the requests to the service daemon.

Figure 1D:
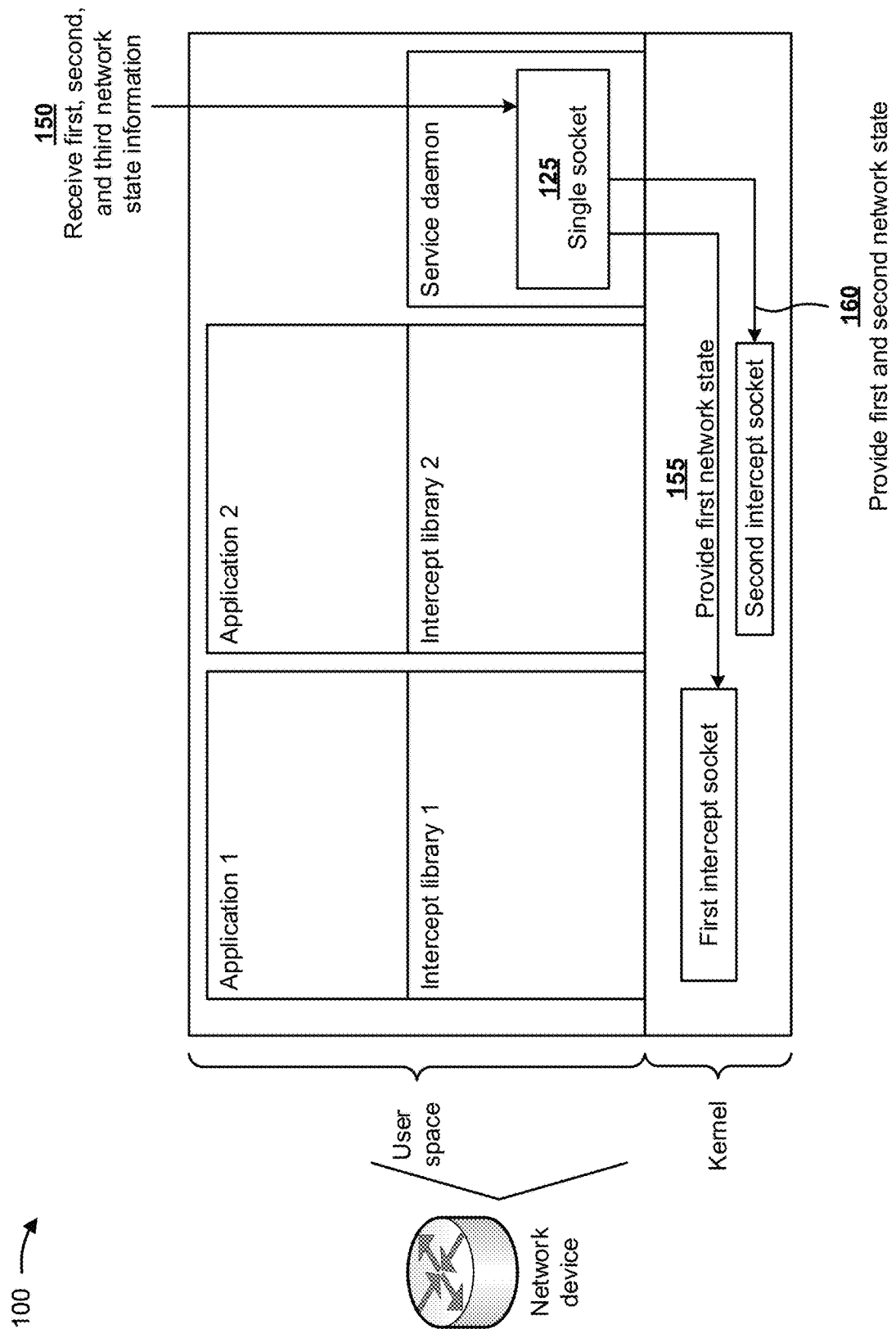

As shown in FIG. 1D, and by reference number 150, the service daemon (e.g., the single socket) may periodically receive, continuously receive, and/or the like the first network state information, the second network state information, and third network state information (e.g., that is different than the first network state information and the second network state information). In some implementations, the service daemon may determine whether the network state information received by the service daemon is subscribed to by applications of the network device based on the requests for subscriptions received by the service daemon. For example, based on the request for the subscription to the first network state information and the request for the subscription to the first network state information and the second network state information, the service daemon may determine that the first network state information is subscribed to by the first application and the second application. Based on the request for the subscription to the first network state information and the second network state information, the service daemon may determine that the second network state information is subscribed to by the second application. The service daemon may also determine that no application is subscribed to the third network state information (e.g., since no requests for subscriptions to the third network state information are received by the service daemon).

As further shown in FIG. 1D, and by reference numbers 155 and 160, the service daemon may provide the first network state information to sockets associated with applications subscribed to receive the first network state information. For example, since the first application and the second application are both subscribed to receive the first network state information, the service daemon may provide the first network state information to the first intercept socket and to the second intercept socket. In this way, the service daemon may provide a single copy of the first network state information (e.g., to subscribed to applications) which may conserve computing resources (e.g., processing resources, memory resources, communication resources, and/or the like) that would otherwise be wasted in generating multiple copies of the first network state information, transmitting the multiple copies, and/or the like.

As further shown in FIG. 1D, and by reference number 160, the service daemon may provide the second network state information to sockets associated with applications subscribed to receive the second network state information. For example, since the second application is subscribed to receive the second network state information, the service daemon may provide the second network state information to the second intercept socket.

Figure 1E:
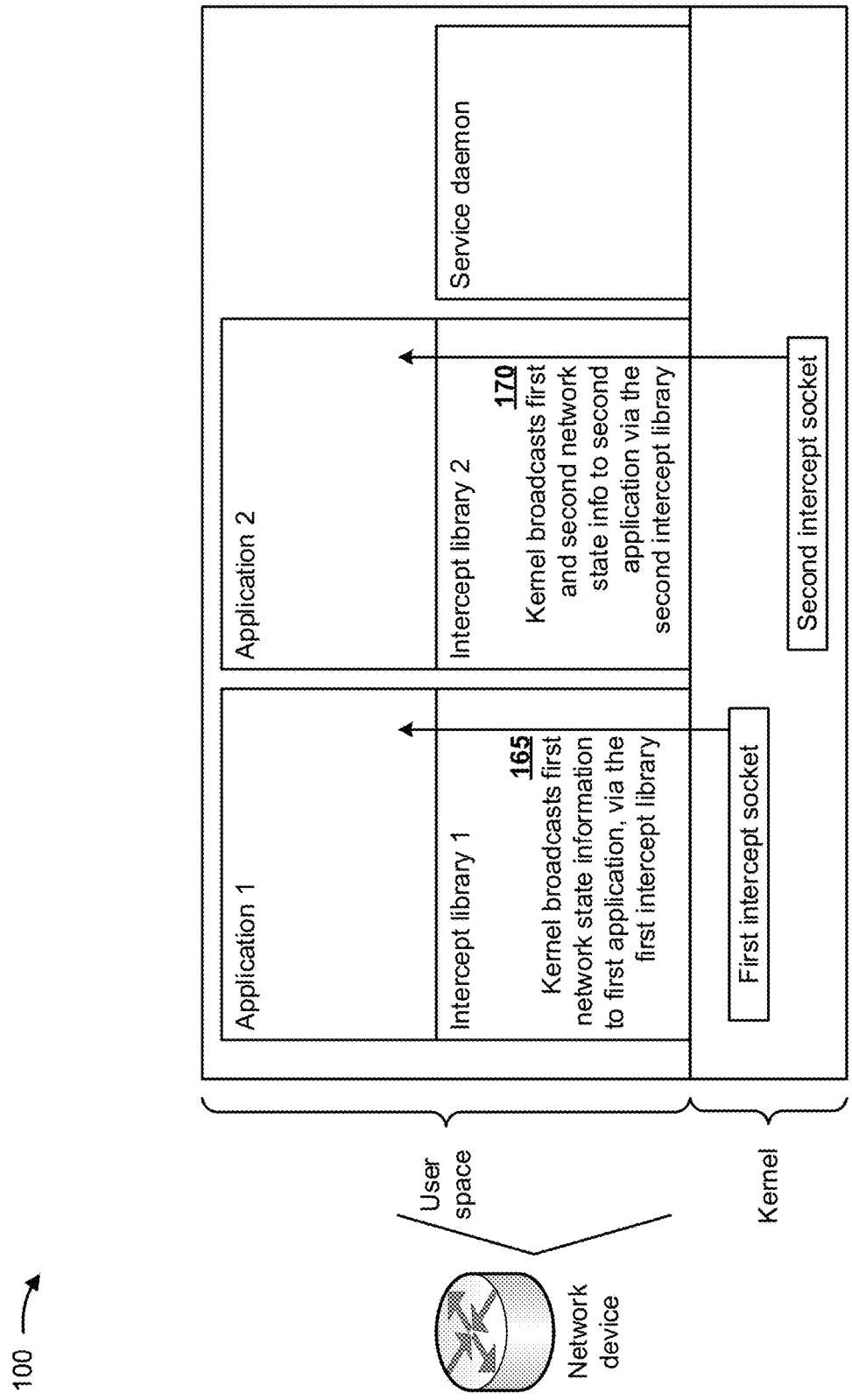

As shown in FIG. 1E, and by reference number 165, the kernel may broadcast the first network state information to the first application, via the first intercept library. In some implementations, the first intercept socket of the kernel may broadcast the first network state information to the first application, via the first intercept library. As further shown in FIG. 1E, and by reference number 170, the kernel may broadcast the first network state information and the second network state information to the second application, via the second intercept library. In some implementations, the second intercept socket of the kernel may broadcast the first network state information and the second network state information to the second application, via the second intercept library.

Figure 1F:
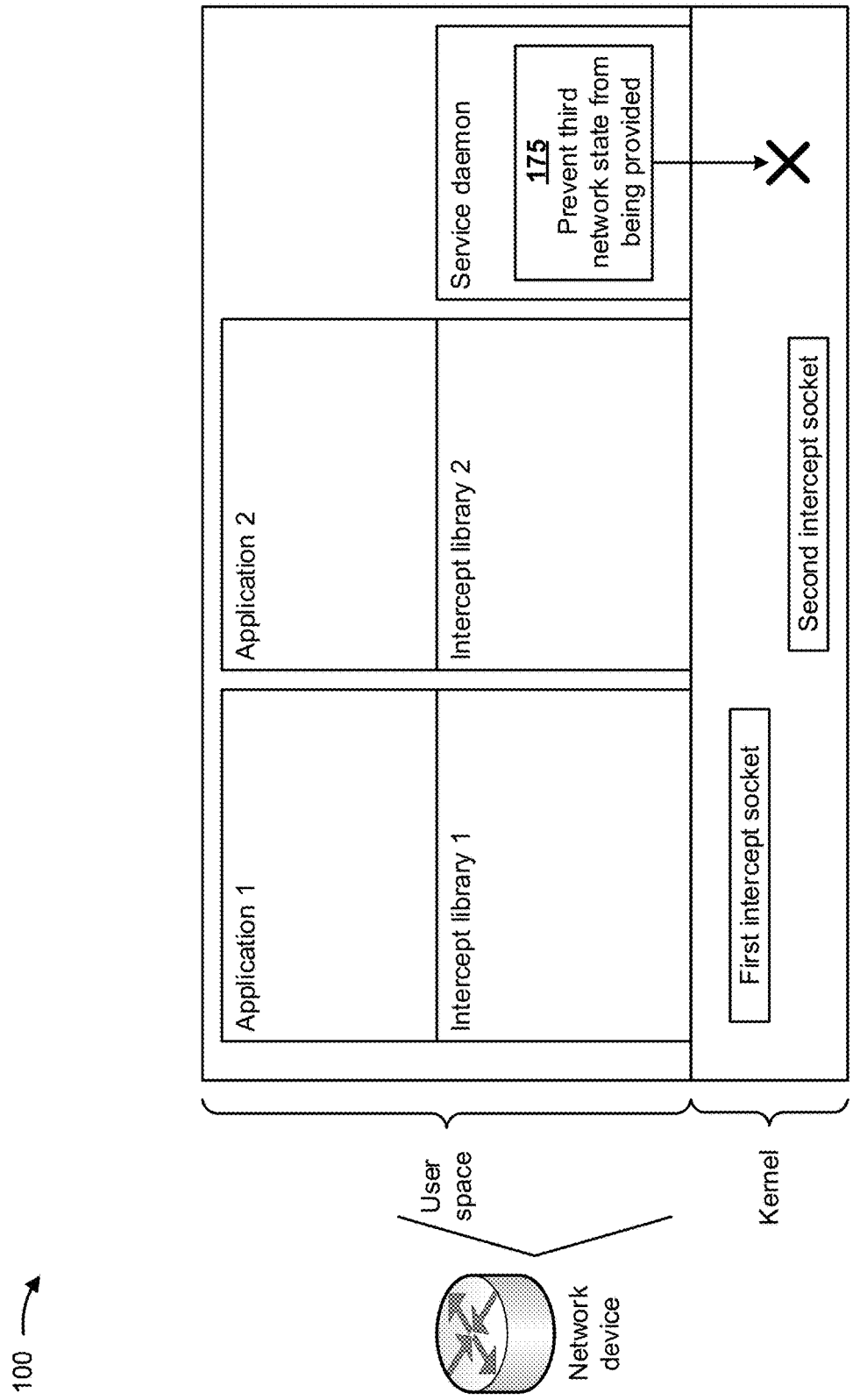

As shown in FIG. 1F, and by reference number 175, the service daemon may prevent the third network state information from being provided to the kernel, which may prevent the kernel from broadcasting the third network state information to the first application and the second application. In some implementations, since no applications of the network device are subscribed to receive the third network state information, the service daemon may prevent the third network state information from being provided to the kernel, which may prevent the kernel from broadcasting the third network state information to first application and the second application. In this way, the service daemon and the kernel may prevent unnecessary provision of network state information, which may conserve computing resources (e.g., processing resources, memory resources, communication resources, and/or the like) associated with the network device.

In this way, the network device enables applications of the network device to obtain network state information when the network state information is not stored in the kernel of the network device, thereby improving functioning of the network device, the network that includes the network device, and/or the like. Moreover, based on enabling applications, configured for network state information stored in a kernel, to operate on the network device without customization as to where the network state information is actually stored (e.g., the user space or in a distributed architecture), the network device reduces utilization of processing resources to customize applications, utilization of memory resources to store multiple customized versions of an application, and/or the like. In this way, the network device may receive asynchronous network state information for applications of the network device without modifying the applications. This conserves computing resources (e.g., processing resources, memory resources, communication resources, and/or the like), networking resources, and/or the like that would otherwise be wasted in modifying applications, testing applications, modifying the kernel, and/or the like.

As indicated above, FIGS. 1A-1F are provided merely as examples. Other examples may differ from what is described with regard to FIGS. 1A-1F.

Figure 2:
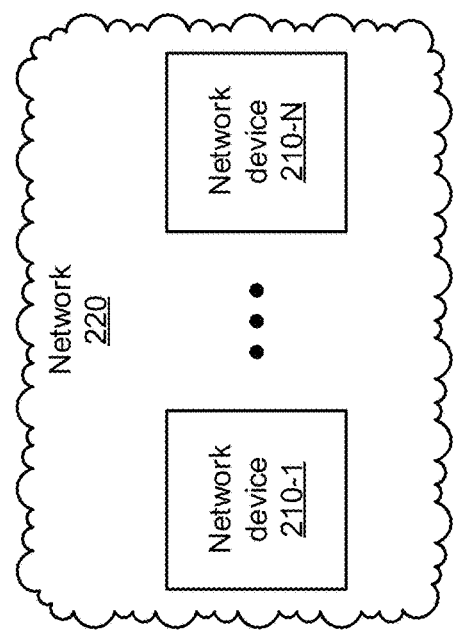
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a group of network devices 210 (shown as network device 210-1 through network device 210-N) and a network 220. Devices of environment 200 may interconnect via wired connections, wireless connections, or a combination of wired and wireless connections.

Network device 210 includes one or more devices capable of receiving, processing, storing, routing, and/or providing traffic (e.g., a packet, other information or metadata, and/or the like) in a manner described herein. For example, network device 210 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 210 may include a gateway, a switch, a firewall, a hub, a bridge, a reverse proxy, a server (e.g., a proxy server, a cloud server, a data center server, and/or the like), a load balancer, and/or a similar device. In some implementations, network device 210 may be a physical device implemented within a housing, such as a chassis. In some implementations, network device 210 may be a virtual device implemented by one or more computer devices of a cloud computing environment or a data center. In some implementations, a group of network devices 210 may be a group of data center nodes that are used to route traffic flow through network 220.

Network 220 includes one or more wired and/or wireless networks. For example, network 220 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
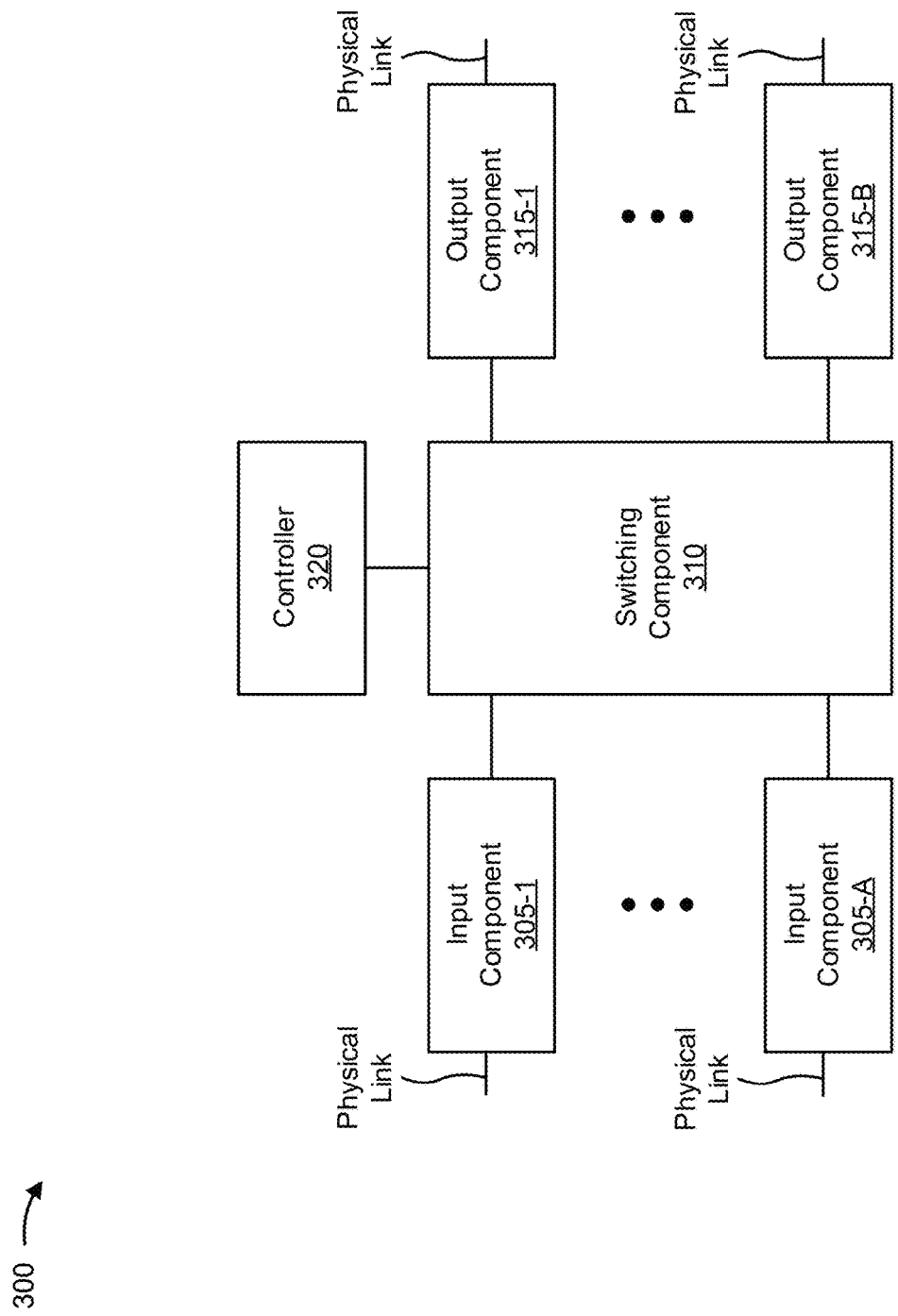
FIGS. 3 and 4 are diagrams of example components of one or more devices of FIG. 2.

FIG. 3 is a diagram of example components of a device 300. Device 300 may correspond to network device 210. In some implementations, network device 210 may include one or more devices 300 and/or one or more components of device 300. As shown in FIG. 3, device 300 may include one or more input components 305-1 through 305-A (A≥1) (hereinafter referred to collectively as input components 305, and individually as input component 305), a switching component 310, one or more output components 315-1 through 315-B (B≥1) (hereinafter referred to collectively as output components 315, and individually as output component 315), and a controller 320.

Input components 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor or processing component. The processor is implemented in hardware, firmware, and/or a combination of software and hardware. In some implementations, controller 320 may include one or more processors that can be programmed to perform a function.

In some implementations, controller 320 may include a random-access memory (RAM), a read only memory (ROM), and/or another type of dynamic or static storage device (e.g., a flash memory, a magnetic memory, an optical memory, and/or the like) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets. In some cases, controller 320 may create a session table based on information determined while initializing a link fault detection session and may forward the session table to input components 305 and/or output components 315.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
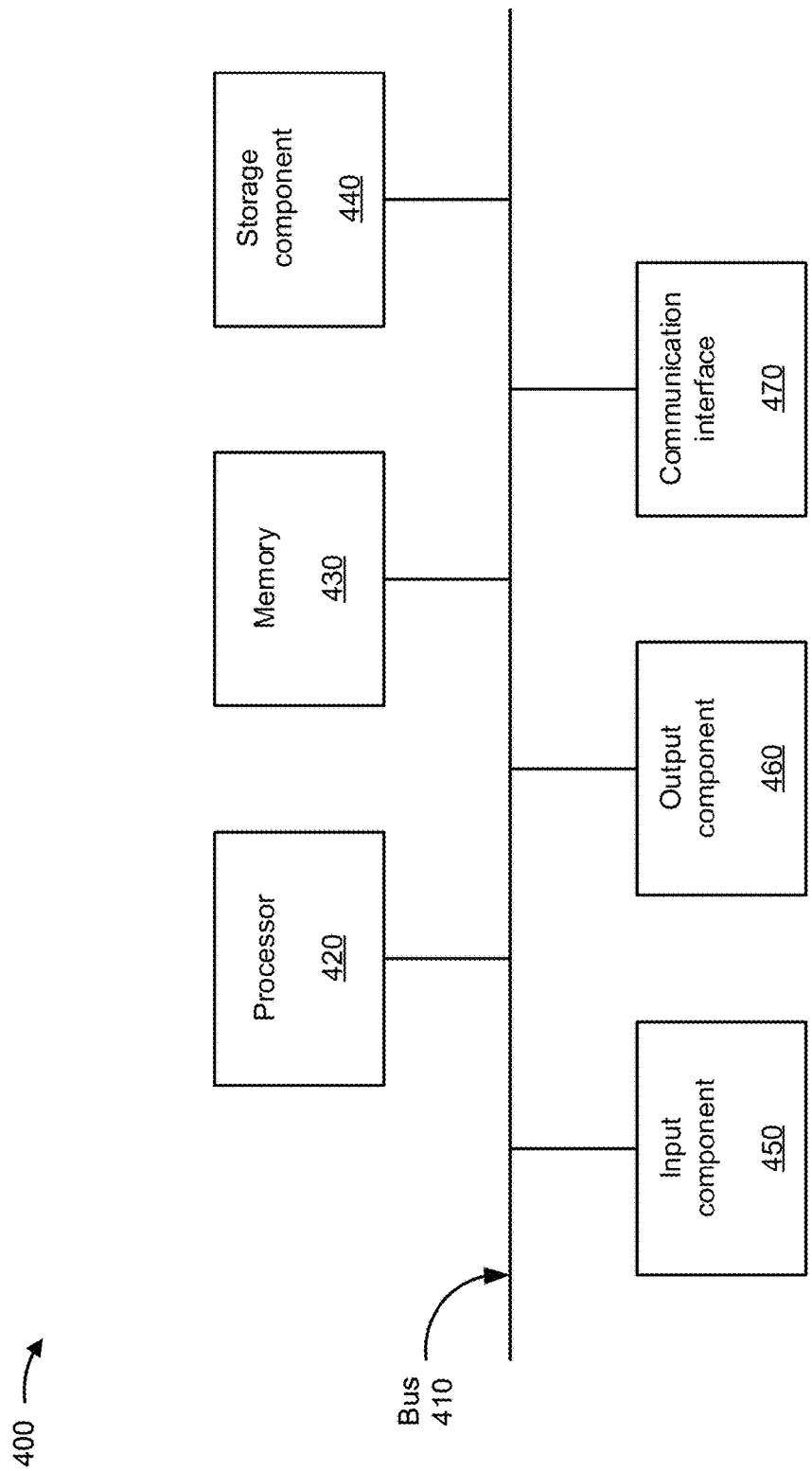

FIG. 4 is a diagram of example components of a device 400. Device 400 may correspond to network device 210. In some implementations, network device 210 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
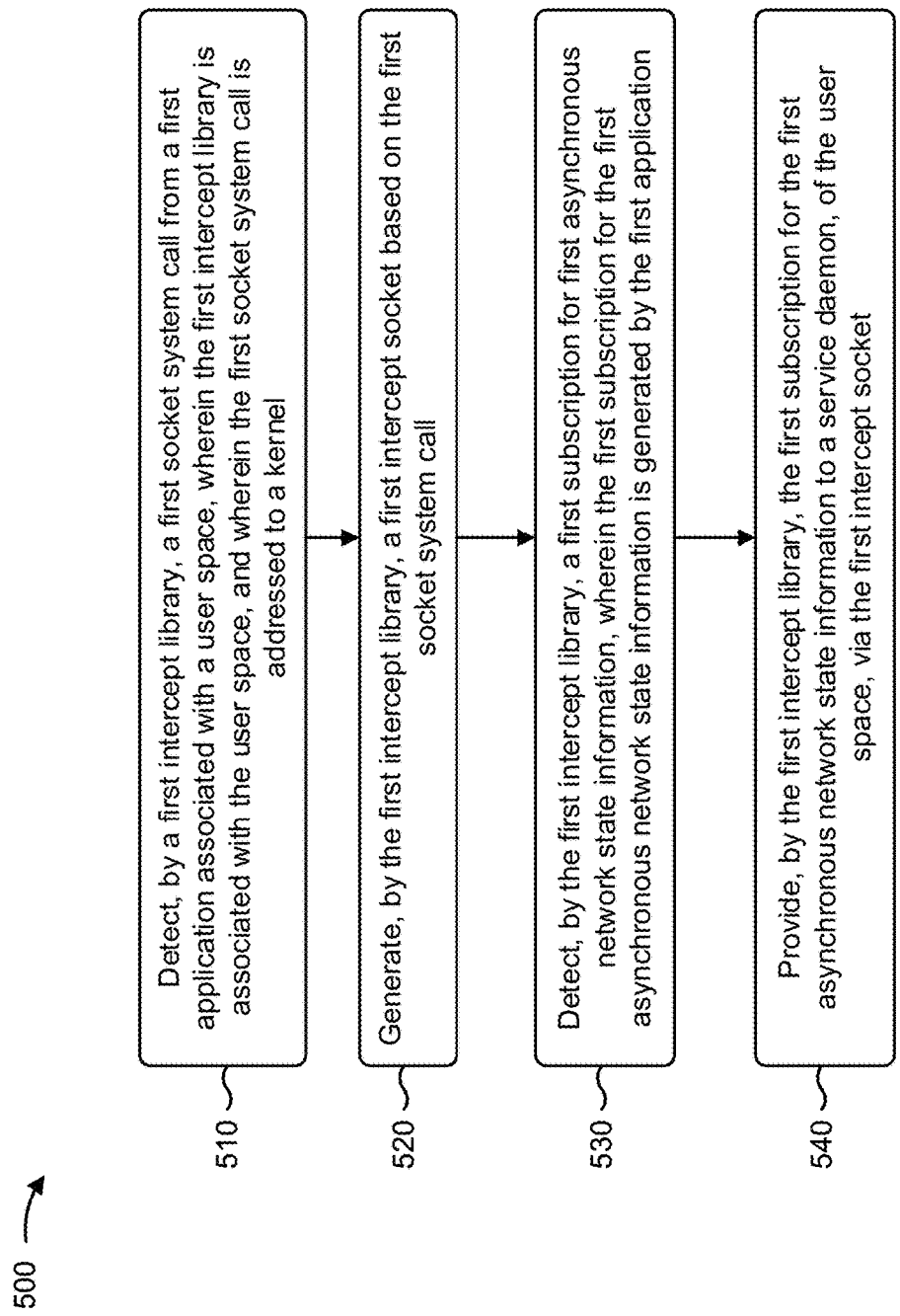

FIG. 5 is a flow chart of an example process 500 for receiving asynchronous network state information for an application of a network device. In some implementations, one or more process blocks of FIG. 5 may be performed by a network device (e.g., network device 210). In some implementations, one or more process blocks of FIG. 5 may be performed by another device or a group of devices separate from or including the network device, such as another network device (e.g., network device 210).

As shown in FIG. 5, process 500 may include detecting, by a first intercept library, a first socket system call from a first application associated with a user space of a network device, wherein the first intercept library is associated with the user space of the network device, and wherein the first socket system call is addressed to a kernel associated with the network device (block 510). For example, a first intercept library of the network device (e.g., using input component 305, switching component 310, controller 320, processor 420, communication interface 470, and/or the like) may detect a first socket system call from a first application associated with a user space of the network device, as described above. In some implementations, the first intercept library may be associated with the user space of the network device, and the first socket system call may be addressed to a kernel associated with the network device.

As further shown in FIG. 5, process 500 may include generating, by the first intercept library, a first intercept socket based on the first socket system call (block 520). For example, the first intercept library of the network device (e.g., using switching component 310, controller 320, processor 420, memory 430, and/or the like) may generate a first intercept socket based on the first socket system call, as described above.

As further shown in FIG. 5, process 500 may include detecting, by the first intercept library, a first subscription for first asynchronous network state information, wherein the first subscription for the first asynchronous network state information is generated by the first application (block 530). For example, the first intercept library of the network device (e.g., using input component 305, switching component 310, controller 320, processor 420, communication interface 470, and/or the like) may detect a first subscription for first asynchronous network state information, as described above. In some implementations, the first subscription for the first asynchronous network state information may be generated by the first application.

As further shown in FIG. 5, process 500 may include providing, by the first intercept library, the first subscription for the first asynchronous network state information to a service daemon, of the user space, via the first intercept socket (block 540). For example, the first intercept library of the network device (e.g., using switching component 310, output component 315, controller 320, processor 420, memory 430, storage component 440, communication interface 470, and/or the like) may provide the first subscription for the first asynchronous network state information to a service daemon, of the user space, via the first intercept socket, as described above.

Process 500 may include additional implementations, such as any single implementation or any combination of implementations described below and/or in connection with one or more other processes described elsewhere herein.

In a first implementation, process 500 may include receiving, by the service daemon, the first asynchronous network state information; broadcasting, by the kernel, the first asynchronous network state information to the first application, via the first intercept library.

In a second implementation, alone or in combination with the first implementation, process 500 may include receiving, by the service daemon, second asynchronous network state information that is different than the first asynchronous network state information; and preventing, by the service daemon, the second asynchronous network state information from being broadcast to the first application, via the first intercept library, based on the first subscription for the first asynchronous network state information.

In a third implementation, alone or in combination with one or more of the first and second implementations, process 500 may include detecting, by a second intercept library of the network device, a second socket system call from a second application associated with the user space, wherein the second intercept library may be associated with the user space, and wherein the second socket system call may be addressed to the kernel; generating, by the second intercept library, a second intercept socket based on the second socket system call; detecting, by the second intercept library, a second subscription for the first asynchronous network state information and second asynchronous network state information that is different than the first asynchronous network state information, wherein the second subscription may be generated by the second application; and providing, by the second intercept library, the second subscription to the service daemon via the second intercept socket.

In a fourth implementation, alone or in combination with one or more of the first through third implementations, process 500 may include receiving, by the service daemon, the first asynchronous network state information and the second asynchronous network state information; broadcasting, by the kernel, the first asynchronous network state information to the first application, via the first intercept library; and broadcasting, by the kernel, the first asynchronous network state information and the second asynchronous network state information to the second application, via the second intercept library.

In a fifth implementation, alone or in combination with one or more of the first through fourth implementations, process 500 may include receiving, by the service daemon, third asynchronous network state information that is different than the first asynchronous network state information and the second asynchronous network state information; preventing, by the service daemon, the third asynchronous network state information from being broadcast to the first application, via the first intercept library, based on the first subscription; and preventing, by the service daemon, the third asynchronous network state information from being broadcast to the second application, via the second intercept library, based on the second subscription.

In a sixth implementation, alone or in combination with one or more of the first through fifth implementations, the second application may not store information associated with the second intercept library.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
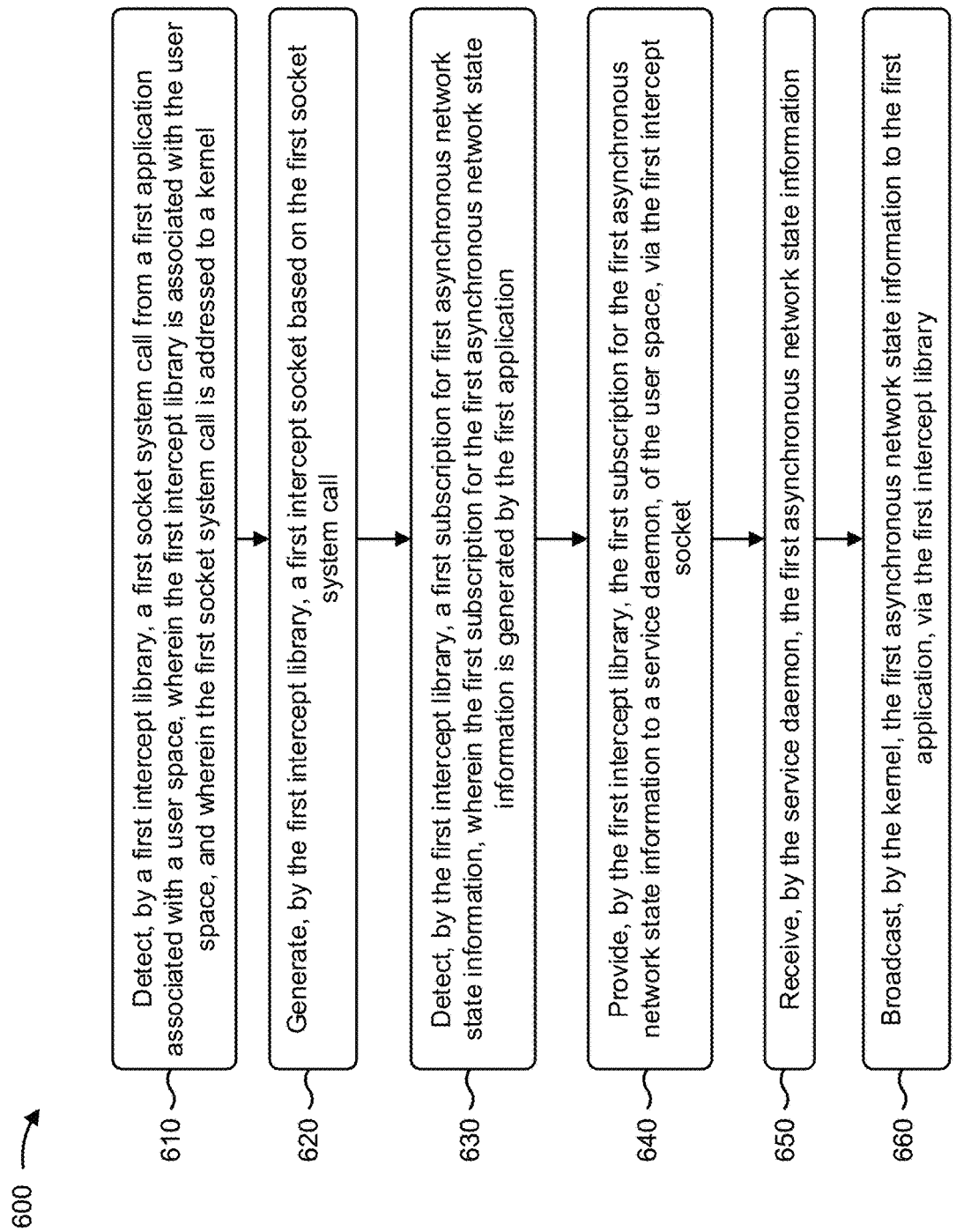

FIG. 6 is a flow chart of an example process 600 for receiving asynchronous network state information for an application of a network device. In some implementations, one or more process blocks of FIG. 6 may be performed by a network device (e.g., network device 210). In some implementations, one or more process blocks of FIG. 6 may be performed by another device or a group of devices separate from or including the network device, such as another network device (e.g., network device 210).

As shown in FIG. 6, process 600 may include detecting, by a first intercept library, a first socket system call from a first application associated with a user space of a network device, wherein the first intercept library is associated with the user space of the network device, and wherein the first socket system call is addressed to a kernel associated with the network device (block 610). For example, a first intercept library of the network device (e.g., using input component 305, switching component 310, controller 320, processor 420, communication interface 470, and/or the like) may detect a first socket system call from a first application associated with a user space of a network device, as described above. In some implementations, the first intercept library may be associated with the user space of the network device, and the first socket system call may be addressed to a kernel associated with the network device.

As further shown in FIG. 6, process 600 may include generating, by the first intercept library, a first intercept socket based on the first socket system call (block 620). For example, the first intercept library of the network device (e.g., using input component 305, switching component 310, controller 320, processor 420, memory 430, communication interface 470, and/or the like) may generate a first intercept socket based on the first socket system call, as described above.

As further shown in FIG. 6, process 600 may include detecting, by the first intercept library, a first subscription for first asynchronous network state information, wherein the first subscription for the first asynchronous network state information is generated by the first application (block 630). For example, the first intercept library of the network device (e.g., using input component 305, switching component 310, controller 320, processor 420, memory 430, communication interface 470, and/or the like) may detect a first subscription for first asynchronous network state information, as described above. In some implementations, the first subscription for the first asynchronous network state information may be generated by the first application.

As further shown in FIG. 6, process 600 may include providing, by the first intercept library, the first subscription for the first asynchronous network state information to a service daemon, of the user space, via the first intercept socket (block 640). For example, the first intercept library of the network device (e.g., using switching component 310, controller 320, processor 420, memory 430, communication interface 470, and/or the like) may provide the first subscription for the first asynchronous network state information to a service daemon, of the user space, via the first intercept socket, as described above.

As further shown in FIG. 6, process 600 may include receiving, by the service daemon, the first asynchronous network state information (block 650). For example, the service daemon of the network device (e.g., using input component 305, switching component 310, controller 320, processor 420, communication interface 470, and/or the like) may receive the first asynchronous network state information, as described above.

As further shown in FIG. 6, process 600 may include broadcasting, by the kernel, the first asynchronous network state information to the first application, via the first intercept library (block 660). For example, the kernel of the network device (e.g., using switching component 310, output component 315, controller 320, processor 420, memory 430, communication interface 470, and/or the like) may broadcast the first asynchronous network state information to the first application, via the first intercept library, as described above.

Process 600 may include additional implementations, such as any single implementation or any combination of implementations described below and/or in connection with one or more other processes described elsewhere herein.

In a first implementation, the first application may not store information associated with the first intercept library.

In a second implementation, alone or in combination with the first implementation, process 600 may include performing one or more application tasks with the first application and based on the first asynchronous network state information.

In a third implementation, alone or in combination with one or more of the first and second implementations, the first asynchronous network state information may include state information associated with the network device.

In a fourth implementation, alone or in combination with one or more of the first through third implementations, the first asynchronous network state information may include information identifying statuses of a plurality of links associated with the network device, or statuses of a plurality of interfaces associated with network device.

In a fifth implementation, alone or in combination with one or more of the first through fourth implementations, process 600 may include setting a socket address to a socket identifier of a socket of the service daemon.

In a sixth implementation, alone or in combination with one or more of the first through fifth implementations, process 600 may include implementing a protocol in the network device that enables the first intercept socket to be generated.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for receiving asynchronous network state information for an application of a network device. In some implementations, one or more process blocks of FIG. 7 may be performed by a network device (e.g., network device 210). In some implementations, one or more process blocks of FIG. 7 may be performed by another device or a group of devices separate from or including the network device, such as another network device (e.g., network device 210).

As shown in FIG. 7, process 700 may include detecting, by a first intercept library, a first socket system call from a first application associated with a user space of the network device, wherein the first intercept library is associated with the user space of the network device, and wherein the first socket system call is addressed to a kernel associated with the network device (block 710). For example, a first intercept library of the network device (e.g., using input component 305, switching component 310, controller 320, processor 420, memory 430, communication interface 470, and/or the like) may detect a first socket system call from a first application associated with a user space of the network device, as described above. In some implementations, the first intercept library may be associated with the user space of the network device, and the first socket system call may be addressed to a kernel associated with the network device.

As further shown in FIG. 7, process 700 may include generating, by the first intercept library and based on the first socket system call, a first intercept socket between the first intercept library and a service daemon, wherein the service daemon is associated with the user space of the network device (block 720). For example, the first intercept library of the network device (e.g., using switching component 310, output component 315, controller 320, processor 420, storage component 440, communication interface 470, and/or the like) may generate, based on the first socket system call, a first intercept socket between the first intercept library and a service daemon, as described above. In some implementations, the service daemon may be associated with the user space of the network device.

As further shown in FIG. 7, process 700 may include detecting, by the first intercept library, a first subscription for first asynchronous network state information, wherein the first subscription for the first asynchronous network state information is generated by the first application (block 730). For example, the first intercept library of the network device (e.g., using input component 305, switching component 310, controller 320, processor 420, communication interface 470, and/or the like) may detect a first subscription for first asynchronous network state information, as described above. In some implementations, the first subscription for the first asynchronous network state information may be generated by the first application.

As further shown in FIG. 7, process 700 may include providing, by the first intercept library, the first subscription for the first asynchronous network state information to the service daemon via the first intercept socket (block 740). For example, the first intercept library of the network device (e.g., using switching component 310, output component 315, controller 320, processor 420, memory 430, communication interface 470, and/or the like) may provide the first subscription for the first asynchronous network state information to the service daemon via the first intercept socket, as described above.

Process 700 may include additional implementations, such as any single implementation or any combination of implementations described below and/or in connection with one or more other processes described elsewhere herein.

In a first implementation, process 700 may include receiving the first asynchronous network state information; broadcasting, by the kernel, the first asynchronous network state information to the first application, via the first intercept library.

In a second implementation, alone or in combination with the first implementation, process 700 may include receiving second asynchronous network state information that is different than the first asynchronous network state information; and preventing, by the service daemon, the second asynchronous network state information from being broadcast to the first application, via the first intercept library, based on the first subscription for the first asynchronous network state information.

In a third implementation, alone or in combination with one or more of the first and second implementations, process 700 may include detecting, by a second intercept library of the network device, a second socket system call from a second application associated with the user space, wherein the second intercept library is associated with the user space, and the second socket system call is addressed to the kernel; generating, by the service daemon, a second intercept socket based on the second socket system call; detecting, by the second intercept library of the network device, a second subscription for the first asynchronous network state information and second asynchronous network state information that is different than the first asynchronous network state information, wherein the second subscription is generated by the second application; providing, by the second intercept library of the network device, the second subscription to the service daemon via the second intercept socket; receiving, by the service daemon, the first asynchronous network state information and the second asynchronous network state information; broadcasting, by the kernel, the first asynchronous network state information to the first application, via the first intercept library; and broadcasting, by the kernel, the first asynchronous network state information and the second asynchronous network state information to the second application, via the second intercept library.

In a fourth implementation, alone or in combination with one or more of the first through third implementations, process 700 may include receiving, by the service daemon, third asynchronous network state information that is different than the first asynchronous network state information and the second asynchronous network state information; preventing, by the service daemon, the third asynchronous network state information from being broadcast to the first application, via the first intercept library, based on the first subscription; and preventing, by the service daemon, the third asynchronous network state information from being broadcast to the second application, via the second intercept library, based on the second subscription.

In a fifth implementation, alone or in combination with one or more of the first through fourth implementations, the first application may not store information associated with the first intercept library.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    detecting, by a first intercept library of a network device, a first socket system call from a first application associated with a user space of the network device,
        wherein the first intercept library is associated with the user space of the network device,
        wherein the first socket system call is addressed to a kernel associated with the network device;
    generating, by the first intercept library of the network device, a first intercept socket based on the first socket system call;
    detecting, by the first intercept library of the network device, a first request for a subscription for first asynchronous network state information addressed to a socket address of the kernel associated with the network device,
        wherein the first request for the subscription for the first asynchronous network state information is generated by the first application,
        wherein the first application is configured to search for network state information in the kernel associated with the network device, and
        wherein the network state information is maintained in the user space of the network device or in a distributed manner among multiple network devices; and
    providing, by the first intercept library of the network device, the first request for the subscription for the first asynchronous network state information to a service daemon, of the user space of the network device, via the first intercept socket.

2. The method of claim 1, further comprising:
    receiving, by the service daemon, the first asynchronous network state information; and
    broadcasting, by the kernel associated with the network device, the first asynchronous network state information to the first application, via the first intercept library.

3. The method of claim 1, further comprising:
receiving, by the service daemon, second asynchronous network state information that is different than the first asynchronous network state information; and
preventing, by the service daemon, the second asynchronous network state information from being broadcast to the first application, via the first intercept library, based on the first request for the subscription for the first asynchronous network state information.

4. The method of claim 1, further comprising:
detecting, by a second intercept library of the network device, a second socket system call from a second application associated with the user space,
wherein the second intercept library is associated with the user space, and
wherein the second socket system call is addressed to the kernel associated with the network device;
generating, by the second intercept library, a second intercept socket based on the second socket system call;
detecting, by the second intercept library, a second request for another subscription for the first asynchronous network state information and second asynchronous network state information that is different than the first asynchronous network state information,
wherein the second request for the other subscription is generated by the second application; and
providing, by the second intercept library, the second request for the other subscription to the service daemon via the second intercept socket.

5. The method of claim 4, further comprising:
receiving, by the service daemon, the first asynchronous network state information and the second asynchronous network state information;
broadcasting, by the kernel associated with the network device, the first asynchronous network state information to the first application, via the first intercept library; and
broadcasting, by the kernel associated with the network device, the first asynchronous network state information and the second asynchronous network state information to the second application, via the second intercept library.

6. The method of claim 4, further comprising:
receiving, by the service daemon, third asynchronous network state information that is different than the first asynchronous network state information and the second asynchronous network state information;
preventing, by the service daemon, the third asynchronous network state information from being broadcast to the first application, via the first intercept library, based on the first request for the subscription for the first asynchronous network state information; and
preventing, by the service daemon, the third asynchronous network state information from being broadcast to the second application, via the second intercept library, based on the second request for the other subscription.

7. The method of claim 4, wherein the second application does not store information associated with the second intercept library.

8. A network device, comprising:
one or more memories; and
one or more processors to:
detect, by a first intercept library, a first socket system call from a first application associated with a user space of the network device,
wherein the first intercept library is associated with the user space of the network device, and
wherein the first socket system call is addressed to a kernel associated with the network device;
generate, by the first intercept library, a first intercept socket based on the first socket system call;
detect, by the first intercept library, a first request for a subscription for first asynchronous network state information addressed to a socket address of the kernel associated with the network device,
wherein the first request for the subscription for the first asynchronous network state information is generated by the first application,
wherein the first application is configured to search for network state information in the kernel associated with the network device, and
wherein the network state information is maintained in the user space of the network device or in a distributed manner among multiple network devices;
provide, by the first intercept library, the first request for the subscription for the first asynchronous network state information to a service daemon, of the user space, via the first intercept socket;
receive, by the service daemon, the first asynchronous network state information; and
broadcast, by the kernel associated with the network device, the first asynchronous network state information to the first application, via the first intercept library.

9. The network device of claim 8, wherein the first application does not store information associated with the first intercept library.

10. The network device of claim 8, wherein the one or more processors are further to:
perform one or more application tasks with the first application and based on the first asynchronous network state information.

11. The network device of claim 8, wherein the first asynchronous network state information includes state information associated with the network device.

12. The network device of claim 8, wherein the first asynchronous network state information includes information identifying one or more of:
statuses of a plurality of links associated with the network device, or
statuses of a plurality of interfaces associated with network device.

13. The network device of claim 8, wherein the one or more processors, when generating the first intercept socket based on the first socket system call, are to:
set a socket address to a socket identifier of a socket of the service daemon.

14. The network device of claim 8, wherein the one or more processors are further to:
implement a protocol in the network device that enables the first intercept socket to be generated.

15. A non-transitory computer-readable medium storing instructions, the instructions comprising:
one or more instructions that, when executed by one or more processors of a network device, cause the one or more processors to:
detect, by a first intercept library, a first socket system call from a first application associated with a user space of the network device, wherein the first intercept library is associated with the user space of the network device, and wherein the first socket system call is addressed to a kernel associated with the network device;

generate, by the first intercept library and based on the first socket system call, a first intercept socket between the first intercept library and a service daemon, wherein the service daemon is associated with the user space of the network device;

detect, by the first intercept library, a first request for a subscription for first asynchronous network state information addressed to a socket address of the kernel associated with the network device, wherein the first request for the subscription for the first asynchronous network state information is generated by the first application, wherein the first application is configured to search for network state information in the kernel associated with the network device, and wherein the network state information is maintained in the user space of the network device or in a distributed manner among multiple network devices; and provide, by the first intercept library, the first request for the subscription for the first asynchronous network state information to the service daemon via the first intercept socket.

16. The non-transitory computer-readable medium of claim 15, wherein the instructions further comprise:

one or more instructions that, when executed by the one or more processors, cause the one or more processors to:

receive, by the service daemon, the first asynchronous network state information; and broadcast, by the kernel associated with the network device, the first asynchronous network state information to the first application, via the first intercept library.

17. The non-transitory computer-readable medium of claim 15, wherein the instructions further comprise:

one or more instructions that, when executed by the one or more processors, cause the one or more processors to:

receive, by the service daemon, second asynchronous network state information that is different than the first asynchronous network state information; and prevent, by the service daemon, the second asynchronous network state information from being broadcast to the first application, via the first intercept library, based on the first request for the subscription for the first asynchronous network state information.

18. The non-transitory computer-readable medium of claim 15, wherein the instructions further comprise:

one or more instructions that, when executed by the one or more processors, cause the one or more processors to:

detect, by a second intercept library of the network device, a second socket system call from a second application associated with the user space, wherein the second intercept library is associated with the user space, and wherein the second socket system call is addressed to the kernel associated with the network device;

generate, by the second intercept library, a second intercept socket based on the second socket system call;

detect, by the second intercept library, a second request for another subscription for the first asynchronous network state information and second asynchronous network state information that is different than the first asynchronous network state information, wherein the second request for the other subscription is generated by the second application;

provide, by the second intercept library, the second request for the other subscription to the service daemon via the second intercept socket;

receive, by the service daemon, the first asynchronous network state information and the second asynchronous network state information;

broadcast, by the kernel associated with the network device, the first asynchronous network state information to the first application, via the first intercept library; and broadcast, by the kernel associated with the network device, the first asynchronous network state information and the second asynchronous network state information to the second application, via the second intercept library.

19. The non-transitory computer-readable medium of claim 15, wherein the instructions further comprise:

one or more instructions that, when executed by the one or more processors, cause the one or more processors to:

receive, by the service daemon, third asynchronous network state information that is different than the first asynchronous network state information and a second asynchronous network state information;

prevent, by the service daemon, the third asynchronous network state information from being broadcast to the first application, via the first intercept library, based on the first request for the subscription for the first asynchronous network state information; and prevent, by the service daemon, the third asynchronous network state information from being broadcast to a second application, via a second intercept library, based on a second request for another subscription.

20. The non-transitory computer-readable medium of claim 15, wherein the first application does not store information associated with the first intercept library.

* * * * *